(12) United States Patent
Tiwari

(10) Patent No.: US 12,086,046 B2
(45) Date of Patent: Sep. 10, 2024

(54) ANALYSIS INFORMATION MANAGEMENT METHOD AND ANALYSIS INFORMATION MANAGEMENT SYSTEM

(71) Applicant: SHIMADZU CORPORATION, Kyoto (JP)

(72) Inventor: Shravan Kumar Tiwari, Singapore (SG)

(73) Assignee: SHIMADZU CORPORATION, Kyoto (JP)

( * ) Notice: Subject to any disclaimer, the term of this patent is extended or adjusted under 35 U.S.C. 154(b) by 1 day.

(21) Appl. No.: 17/744,642

(22) Filed: May 14, 2022

(65) Prior Publication Data
US 2023/0019010 A1    Jan. 19, 2023

(30) Foreign Application Priority Data

Jul. 15, 2021   (SG) ........................... 10202107791Q

(51) Int. Cl.
*G06F 11/30* (2006.01)
*G06F 11/32* (2006.01)

(52) U.S. Cl.
CPC ...... *G06F 11/3086* (2013.01); *G06F 11/3072* (2013.01); *G06F 11/324* (2013.01)

(58) Field of Classification Search
CPC ............. G06F 11/3086; G06F 11/3072; G06F 11/324; G06Q 10/0639
USPC ......................... 707/722, 736, 754, 755, 769
See application file for complete search history.

(56) References Cited

U.S. PATENT DOCUMENTS

| 10,331,720 | B2* | 6/2019 | Neels .................. G06F 3/04842 |
| 2008/0091486 | A1* | 4/2008 | Aoyama .......... G06Q 10/06398 |
| | | | 705/7.42 |
| 2012/0304095 | A1* | 11/2012 | Dennis .................. G06Q 10/06 |
| | | | 715/771 |

(Continued)

FOREIGN PATENT DOCUMENTS

| WO | 2017/098599 A1 | 6/2017 |
| WO | 2017/098650 A1 | 6/2017 |

OTHER PUBLICATIONS

Office Action for corresponding Indian Patent Application No. 202244027495 dated Mar. 14, 2023, with English language translation.

*Primary Examiner* — Phong H Nguyen
(74) *Attorney, Agent, or Firm* — Renner, Otto, Boisselle & Sklar, LLP

(57) ABSTRACT

One mode of the analysis information management method according to the present invention is a method for managing information related to an analysis by an analyzing device, using a computer or computers, including the steps of: collecting, as comprehensive log information, work-log information related to a use of the analyzing device; calculating the number of executions of each of types of work including a manual analysis operation and a batch analysis operation, using at least a portion of the comprehensive log information collected in the step of collecting; presenting, to a user, information of the number of executions of each type of work obtained in the step of calculating; receiving, from the user, an input of one or more types of work selected from the types of work; and presenting, to the user, the work-log information concerning the one or more types of work received from the user.

4 Claims, 5 Drawing Sheets

(56) References Cited

U.S. PATENT DOCUMENTS

| | | | |
|---|---|---|---|
| 2016/0025727 A1* | 1/2016 | Nguyen | G01N 35/028 |
| | | | 435/5 |
| 2018/0225617 A1* | 8/2018 | Leung | G06Q 10/06398 |
| 2019/0050422 A1 | 2/2019 | Ono | |
| 2019/0087386 A1 | 3/2019 | Ono | |
| 2021/0065081 A1 | 3/2021 | Morita et al. | |

* cited by examiner

Fig. 4

Showing Log data for Method Audit Trails in the data range [25-05-2019 to 25-11-2019]

| PC Name | Project Name | Instrument Name | User Name | Application Name | Audit Type | File Name | Review Status | Audit Trail Versions | |
|---|---|---|---|---|---|---|---|---|---|
| 🔍 | 🔍 | 🔍 | 🔍 | 🔍 | 🔍 | 🔍 | 🔍 | 🔍 | |
| PC-01 | FILM COATED TABLETS DISSO BY HPLC | Ins01 | User01 | Analysis Service | Method Audit Trails | WASH-D(PE015).lcm | *Not Reviewed* | 4 | Show Details |
| PC-02 | METHOD DEVELOPMENT | Ins02 | User02 | Analysis Service | Method Audit Trails | SHUT_MTH.lcm | *Not Reviewed* | 6 | Show Details |
| PC-03 | METHOD DEVELOPMENT | Ins03 | User03 | Analysis Service | Method Audit Trails | SHUT(PE075)_INST_MTH.lcm | *Not Reviewed* | 27 | Show Details |
| PC-04 | METHOD TRANFER FOR TZ DISSOLUTION BY HPLC | Ins04 | User04 | Analysis Service | Method Audit Trails | WASH.lcm | *Not Reviewed* | 4 | Show Details |

110

ANALYSIS INFORMATION MANAGEMENT METHOD AND ANALYSIS INFORMATION MANAGEMENT SYSTEM

TECHNICAL FIELD

The present invention relates to an analysis information management method and system for managing information related to analyses using analyzing devices.

BACKGROUND ART

In recent years, analyzing systems in which a plurality of analyzing devices (such as liquid chromatographs and/or mass spectrometers), computers functioning as servers, and computers used as operation terminals, are connected to each other via a communication network have been widely used on sites for the research and development of drugs, beverages, foodstuffs or other products as well as the quality control of those products or other purposes. This type of analyzing system is equipped with various functions for guaranteeing the reliability of the data acquired by analyses and that of the analysis results obtained by processing raw data. For example, as described in Patent Literature 1 or 2, an existing analyzing system is configured so that all operations and tasks performed on all devices in the system (e.g., analyzing devices, computers and other devices) are exhaustively recorded as log information in a database.

In particular, an analyzing system used in the area of drugs (or the like) is required to be fully compliant to various laws and regulations in order to guarantee the safety and effectiveness of the products. To this end, data integrity is essential. In order to confirm that the data integrity is guaranteed, an individual in charge of the audit (e.g., the director on the site of the analysis or an individual in charge of the quality assurance; this type of individual is hereinafter called an "auditor") regularly or irregularly performs the tasks of checking log information as audit trail data and approving those data. That is to say, the auditor examines the contents of the log information produced within a specified audit period, to confirm, for example, that there was none of the various dishonest or inappropriate activities, such as an intentional alteration to data, acquisition of data by an analysis under inappropriate analysis conditions, or inappropriate repetition of an analysis. If no problem has been detected, the auditor approves the series of analyzing operations performed within the audit period.

CITATION LIST

Patent Literature

Patent Literature 1: WO 2017/098599 A
Patent Literature 2: WO 2017/098650 A

SUMMARY OF INVENTION

Technical Problem

In the conventional analyzing system, the auditor needs to check each individual piece of log information to be audited on the display screen of a computer. However, in an analyzing system including a large number of analyzing devices, a huge amount of log information is accumulated. Furthermore, there may be many analysis operators individually conducting a large number of analyses, or a single analysis operator simultaneously performing analyses using a plurality of analyzing devices within the same time zone. Therefore, the contents of the log information accumulated in the database are considerably complex. Those factors make the auditing work by the auditor extremely complicated and require a significant amount of time and expense. Omissions or errors are also liable to occur in the audit, which constitutes a factor that lowers the reliability of the audit.

The present invention has been developed to solve these problems. Its primary objective is to provide an analysis information management method and system which can reduce the burden of the auditor and decrease the amount of labor and expense for the audit, as well as reduces omissions and errors in the audit, to thereby increase the accuracy of the data integrity.

Solution to Problem

One mode of the analysis information management method according to the present invention developed for solving the previously described problems is a method for managing information related to an analysis by an analyzing device, using a computer or computers, the method including the steps of:
  collecting, as comprehensive log information, work-log information related to a use of the analyzing device;
  calculating the number of executions of each of a plurality of types of work including a manual analysis operation and a batch analysis operation, using at least a portion of the comprehensive log information collected in the step of collecting;
  presenting, to a user, information of the number of executions of each of the types of work obtained in the step of calculating;
  receiving, from the user, an input of one or more types of work selected from the plurality of types of work; and
  presenting, to the user, the work-log information concerning the one or more types of work received from the user.

One mode of the analysis information management system according to the present invention is a system for carrying out the previously described mode of the analysis information management method, which is an analysis information management system for managing information related to an analysis by an analyzing device, the system including:
  an information collector configured to collect, as comprehensive log information, work-log information related to a use of the analyzing device;
  a statistical processor configured to calculate the number of executions of each of a plurality of types of work including a manual analysis operation and a batch analysis operation, using at least a portion of the comprehensive log information collected by the information collector;
  a first information presenter configured to present, to a user, information of the number of executions of each of the types of work obtained by the statistical processor;
  a type-of-work receiver configured to receive, from the user, an input of one or more types of work selected from the plurality of types of work; and
  a second information presenter configured to create, in response to an input operation of a selection by the user through the type-of-work receiver, a list of the work-log information concerning the one or more types of work selected, and present the list to the user.

Advantageous Effects of Invention

According to the present invention, the user (typically, an auditor) can refer to the number of executions of each type of work and easily locate a type of work that cannot or is most unlikely to be carried out in a normal situation, e.g., when the analyzing operation is executed by a correct procedure following the manual. Then, the auditor can be focused on the located type of work and conduct detailed checking of the work-log information. In other words, the work-log information to be audited can be narrowed down to a certain extent, so that the user can efficiently examine the work-log information when performing the audit. Thus, the present invention can consequently reduce the burden of the auditor and decrease the amount of labor and expense for the audit. The present invention can also reduce omissions and errors in the audit and further increase the accuracy of the data integrity.

BRIEF DESCRIPTION OF DRAWINGS

FIG. 4 is a diagram showing one example of the list of the work-log information corresponding to a specified type of work.

DESCRIPTION OF EMBODIMENTS

[Procedure of Analyzing Operation Using Analyzing Device]

In advance of the description of one embodiment of the analysis information management method and system according to the present invention, a brief description of a procedure of an analysis using an analyzing device (e.g., liquid chromatograph) is initially given. It is evident that the following analytical procedure is a standard procedure and should not be interpreted as limiting the present invention in any form.

Figure 5:
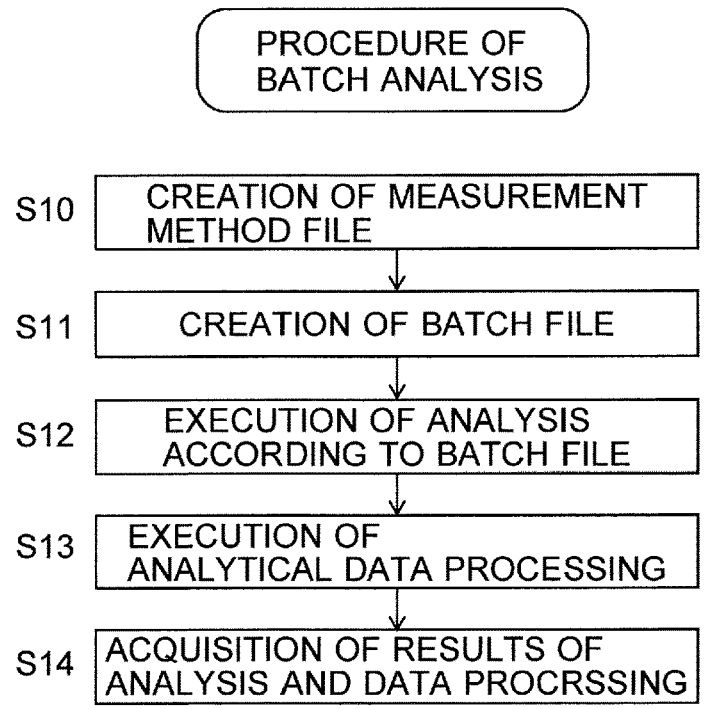
FIG. 5 is a chart showing an operational procedure in a batch analysis.
Figure 6:
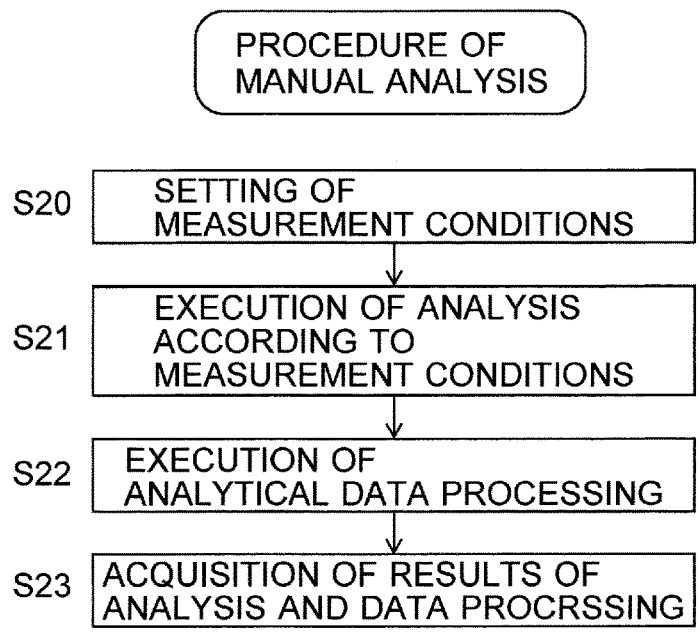
FIG. 6 is a chart showing an operational procedure in a manual analysis.

FIG. 5 is a flowchart showing a standard operational procedure in a batch analysis. FIG. 6 is a flowchart showing a standard operational procedure in a manual analysis.

A batch analysis is a technique for automatically and sequentially analyzing a large number of prepared samples.

An individual in charge of an analysis initially prepares a method file in which analysis conditions (and other related matters) are specified in detail (Step S10). It should be noted that a method file is not always prepared by an individual in charge of an analysis. It many cases, a technician or manager who is familiar with the analysis prepares a method file. In particular, in some kind of organization, such as an analysis trustee company which undertake analyzing operations or a major manufacturer, a mere operator of a device who does not have the permission to create or edit a method file often takes charge of an analysis.

Next, the individual in charge of the analysis (who is hereinafter called the "analysis operator") prepares a batch file in which the order of analyses of the samples and the method files to be used for the analyses of the individual samples are specified (Step S11). After the batch file has been prepared, the analysis operator issues a command to execute the analysis. Upon receiving this command, the analyzing device sequentially performs an analysis for each sample according to the set batch file (Step S12). Although this depends on the analyzing device, it is normally the case that the series of analyses are automatically performed according to the batch file. Therefore, the analysis operator does not need to stay by the analyzing device, doing some operations or tasks. For example, the analyzing device can perform analyses for a large number of samples during the night or on a no-working day.

In the middle of the execution of the batch analysis, when an analysis of one sample has been completed and a set of data has been acquired, an analytical data processing according to the specified analytical processing conditions is automatically performed, for example, on a personal computer connected to the analyzing device to carry out, for example, a qualitative or quantitative analysis (Step S13). It is naturally possible to perform the analytical data processing after the completion of the analyses of all samples, rather than perform the analytical data processing for each individual sample. Thus, the analysis operator can obtain analysis results and data-processing results, without being required to perform any substantial task during the sample analysis and data processing (Step S14).

In the case of a manual analysis, the analysis operator appropriately sets analysis conditions (Step S20) and operates the analyzing device to analyze a target sample under the set analysis conditions. The analyzing device performs the analysis of the target sample according to the set analysis conditions (Step S21). After the analysis has been completed and a set of data has been acquired, the analysis operator sets predetermined analytical processing conditions on the personal computer connected to the analyzing device and carries out an analytical data processing (Step S22). Thus, the analysis operator can obtain analysis results and data-processing results for the target sample (Step S23).

In general, manual analyses are performed in some typical cases. For example, manual analyses are often performed when the analysis conditions must be finely tuned since appropriate analysis conditions for the target sample are unknown, or when a careful analysis should be performed for a small number of samples. Therefore, manual analyses are frequently performed, for example, on the site of the research and development in a university or enterprise, whereas they are rarely performed on the site of a large-scale analysis, as in an analysis trustee company or similar organization mentioned earlier.

[Configuration of Analyzing System According to Present Embodiment]

Figure 1:
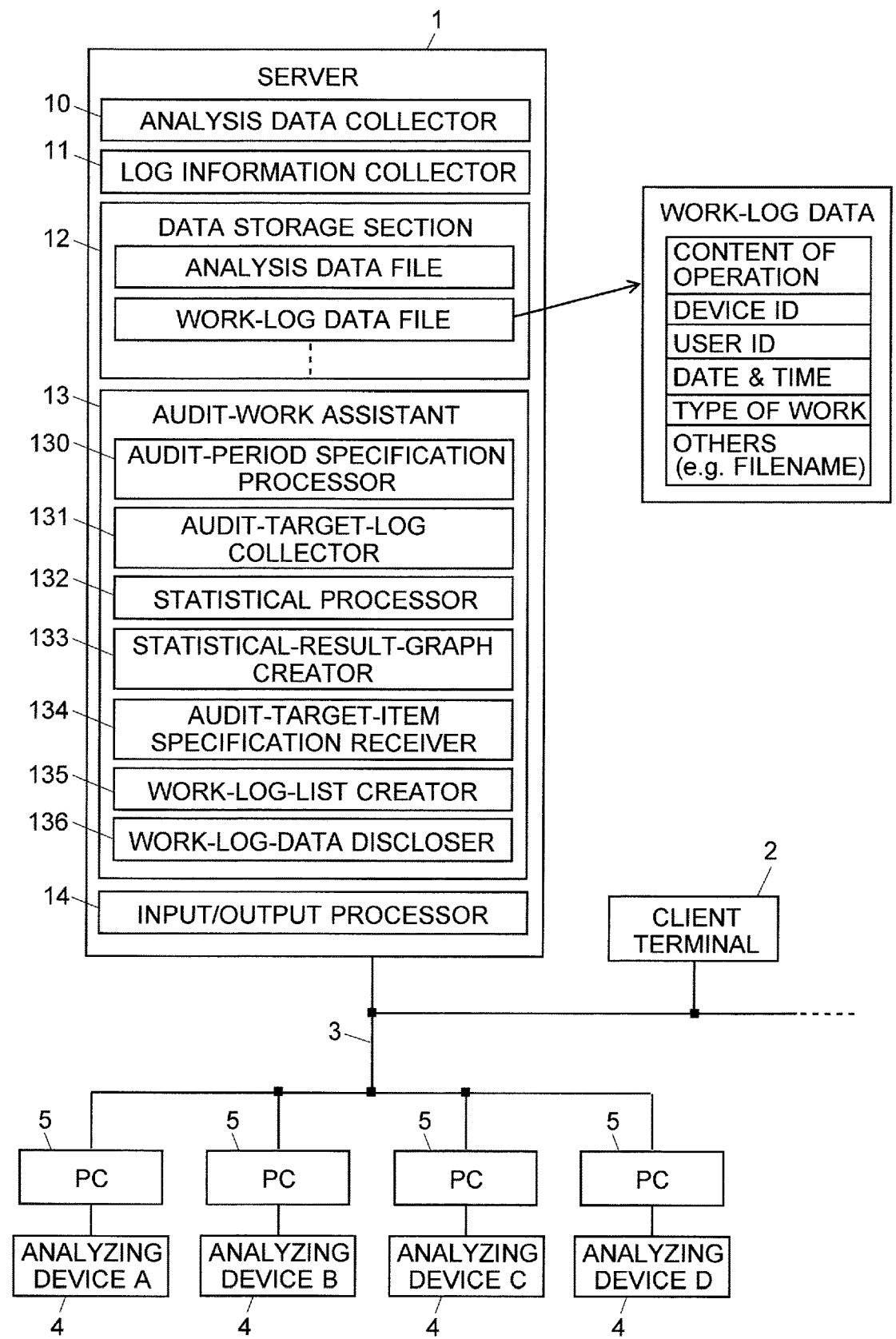
FIG. 1 is a schematic configuration diagram of one embodiment of an analyzing system including an analysis information management system according to the present invention.

Hereinafter described with reference to the attached drawings is one embodiment of an analyzing system including an analysis information management system for carrying out the analysis information management method according to the present invention. FIG. 1 is an overall configuration diagram of the analyzing system according to the present embodiment.

The analyzing system according to the present embodiment includes a server 1, client terminal 2, and personal computers (PCs) 5 connected to each other via a communication network 3, such as a local area network (LAN). The server 1 is actually a comparatively high-performance computer, while the client terminal 2 is actually a personal computer (or portable digital assistant) or similar device. Each PC 5 is connected to an analyzing device 4 and is mainly responsible for the control of the analyzing device 4 and the analytical processing of the data collected by the analyzing device 4. The communication network 3 may be connected to the Internet or similar external network, although the network 3 is often isolated from external networks when security is considered to be critical.

In the example shown in FIG. 1, each PC 5 has one analyzing device 4 connected, although multiple analyzing devices 4 can be connected to one PC 5. It is also possible to effectively incorporate the functions of the PC 5 into an analyzing device 4 and directly connect the analyzing device 4 to the communication network 3. The number of PCs 5 or client terminals 2 connected to the communication network 3 may be determined as needed. It should naturally be understood that the server 1 does not always need to be a single computer; the functions of the server 1 may be distributed among a plurality of computers.

The server 1 includes an analysis data collector 10, log information collector 11, data storage section 12, audit-work assistant 13 and input/output processor 14 as its functional blocks. The audit-work assistant 13 includes an audit-period specification processor 130, audit-target-log collector 131, statistical processor 132, statistical-result-graph creator 133, audit-target-item specification receiver 134, work-log-list creator 135 and work-log-data discloser 136 as its sub-functional blocks. The data storage section 12 is a kind of database, in which various data files to be created in the computers included in the present system are to be stored, such as analysis data files, work-log data files and analysis-result report files.

As noted earlier, the server 1 is actually a computer. Therefore, the aforementioned functional blocks are embodied by a piece of dedicated software (program) for analysis information management preinstalled on the computer and running on the same computer. This type of analysis information management program can be stored in various types of non-transitory computer readable record media and offered to users. If the communication network 3 is connected to an external network, the program can be offered to users in the form of data transferred through those networks. For a user who is going to newly introduce the present system, the program can be offered as a preinstalled program on a computer which is a component of the system.

As will be described later, the client terminal 2 has the function of displaying various kinds of information on the display screen of the terminal 2 by sending and receiving data to and from the server 1 through the communication network 3, as well as the function of allowing users to give instructions or make responses through a keyboard, pointing device or other input devices provided for the terminal 2. In the system according to the present embodiment, those functions are implemented by using a standard web browser installed on the client terminal 2, so there is no need to introduce a special, or dedicated, software application. Needless to say, a dedicated software application may be introduced in the client terminal 2 to realize similar functions.

Each PC 5 connected to an analyzing device 4 has a piece of dedicated controlling-and-processing software installed for controlling the analyzing device 4 as well as collecting and analytically processing the data acquired by the analyzing device 4. This software additionally has the function of sending and receiving predetermined kinds of data to and from the server 1.

In the server 1, the analysis data collector 10 gathers analysis data acquired by analyses performed on samples in the analyzing devices 4, analytical-processing data acquired by an analytical processing of the analysis data on the PCs 5, as well as various kinds of information (e.g., analysis conditions) related to the analyses and analytical processing through the communication network 3, and saves the gathered data as an analysis data file in the data storage section 12. Examples of the information to be saved in the analysis data file include sample information (e.g., sample name and amount of sample), device ID for identifying the analyzing device 4 used for the analysis, date and time of the analysis and analytical processing, user ID for identifying the analysis operator, analysis conditions (e.g., method-file name), analysis data acquired by the analysis, various kinds of calculated values obtained through the analytical processing based on the analysis data, as well as information related to those values (e.g., calibration curve).

The log information collector 11 gathers individual work-log information from all the analyzing devices 4 and computers 1, 2 and 5 in the present system through the communication network 3. Each piece of individual work-log information includes information showing an operation or task performed by a user on an analyzing device 4 or computer 1, 2 or 5, or information indicating a device status, such as an error message generated by an analyzing device 4, PC 5, or other devices during the execution of an analysis or analytical processing. The collected information is saved in the data storage section 12. One work-log data file holds various kinds of data and information related to one specific task or operation.

As one example, as shown in FIG. 1, one work-log data file may contain information including the following: the content of the operation or task, device ID for identifying the analyzing device 4, PC 5 or client terminal 2 on which the operation or task was performed, date and time of the operation, user ID for identifying the analysis operator who performed the operation or task, as well as the type of work. Another example of the information to be recorded in the work-log data file is the data ID which identifies a data file for which some file operation was performed, such as the saving, reading or printing of the data file.

The type of work indicates the type of operation or task performed by a user (e.g., analysis operator). In the system according to the present embodiment, the types of work include a batch analysis operation, analytical data processing after a batch analysis, manual analysis operation, manual analytical data processing, method-file creation/editing, system-related operation as well as report preparation/editing. Examples of the system-related operation include a change in the setting of the computer 1, 2 or 5 included in the present analyzing system, as well as the installation, uninstallation and update of a software application. A system-related operation which is not directly related to an analyzing operation or analytical processing may also be included. Each of those types of work corresponds to a specific operation or task to be audited, which will be described later.

Figure 2:
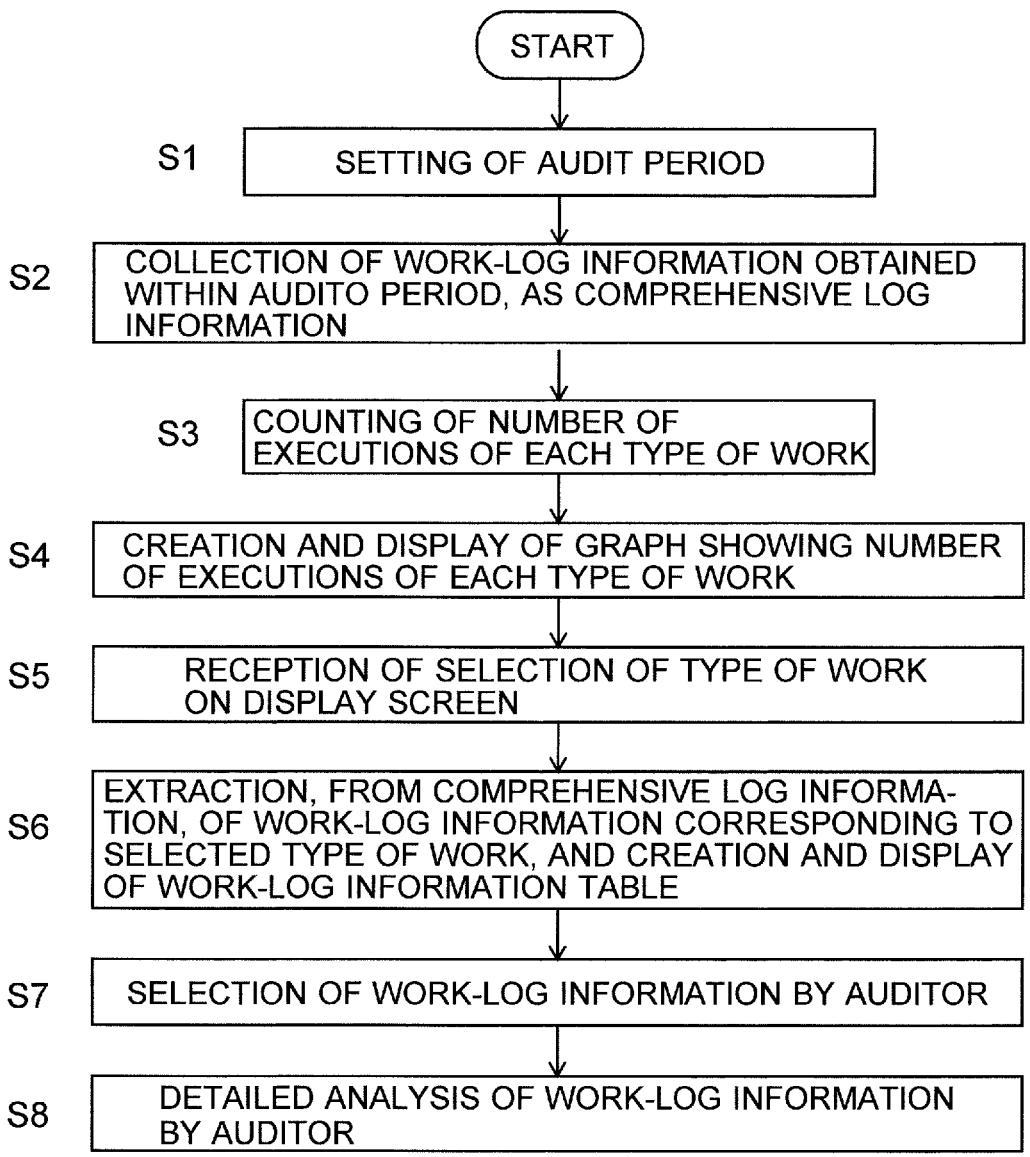
FIG. 2 is a flowchart showing a sequence of operations and processing in an audit of the work-log information in the analyzing system according to the present embodiment.

Next, operations which an auditor performs for checking an audit trail, as well as the processing which is executed by the server 1 and other related sections according to the auditor's operations, in the analyzing system according to the present embodiment will be described with reference to FIGS. 2-4. FIG. 2 is a flowchart showing the sequence of operations and processing in an audit.

From the client terminal 2 (or a user interface provided for the server 1, though not shown in FIG. 2), an auditor logs into the system, with auditor's rights, and performs a predetermined operation. In response to this operation, the audit-work assistant 13 on the server 1 begins to function. The audit-period specification processor 130 initially displays an audit-period input field on the display screen of the client terminal 2 through the input/output processor 14. The auditor inputs a period which should be covered by the audit. The audit-period specification processor 130 receives the input and determines the audit period (Step S1). For example, the audit period is determined by specifying the beginning and ending dates (in a day/month/year format).

After the audit period has been determined, the audit-target-log collector 131 gathers, as comprehensive log information, a number of work-log data files that fall within the audit period (Step S2). It is hereby assumed that all pieces of work-log information from the entire system have been accumulated in the server 1. In some cases, one or more pieces of work-log information which have not yet been collected by the server 1 at the moment may still remain on some of the PCs 5 or client terminal 2. Accordingly, the audit-target-log collector 131 may be configured to access not only the server 1 but also all computers in the system to exhaustively collect all pieces of work-log information saved within the period of time concerned and aggregate them into comprehensive log information.

The statistical processor 132 recognizes the type of work of each piece of work-log information included in the collected comprehensive log information and counts the number of pieces of the work-log information for each type of work to obtain the number of executions of the operation or task for each type of work (Step S3). As explained earlier, the types of work in the present example include the batch analysis operation, analytical data processing after a batch analysis, manual analysis operation, manual analytical data processing, method-file creation/editing, system-related operation as well as report preparation/editing. The number of executions is determined for each of those types of work. If pieces of work-log information corresponding to an unnecessary type of work are contained in the comprehensive log information, it is unnecessary to count the number of executions for those pieces of work-log information. That is to say, a portion of the work-log information in the comprehensive log information may be excluded from the processing in Step S3.

The statistical-result-graph creator 133 creates a graph in a form in which the number of executions of the operation or task of each type of work can be easily compared, and displays the graph on the display screen of the client terminal 2 through the input/output processor 14 (Step S4). FIG. 3 is one example of the graph 100 displayed in this step, which is a bar chart showing the number of executions of each type of work. The "Audit Type" in this graph is the types of work mentioned earlier. Starting from the left end, the audit types in FIG. 3 respectively correspond to the manual analytical data processing, manual analysis operation, analytical data processing after a batch analysis, batch analysis operation, method-file creation/editing, system-related operation, as well as report preparation/editing. On this graph, the auditor can instantaneously compare the number of executions of the operation or task of each type of work.

Some of the existing analyzing systems also have the function of displaying a work-log-information list which allows the auditor to visually check work-log information. However, the list presents many pieces of work-log information corresponding to various types of work in a mixed form. Some systems are also known to have the function of narrowing the display of the work-log information down to a specific type of work. However, those systems do not provide useful information for determining which type of work is important when checking the work-log information. Therefore, in principle, it is necessary to check all pieces of work-log information, which requires an extreme amount of time and labor.

On the other hand, the present analyzing system shows the number of pieces of the work-log information for each type of work which occurred during the audit period. From this information, it is possible to determine which type of work should be focused on in the audit, i.e., to infer which type of work is likely to be related to a dishonest or inappropriate activity.

For example, consider the situation in which most of the analyses performed within the audit period were batch analysis operations and not manual analyses. As noted earlier, a batch analysis uses a method file. In normal cases, the method file is a validated file that the analysis operator is not allowed to modify without permission. Under such a situation, if there are a small number of manually performed analyses, it is often the case that those manual analyses were conducted to cover some mistake made by the analysis operator, such as an incorrect arrangement of samples. There is also the possibility that an analysis operator who could not obtain an intended result from an analysis once more performed the analysis after partially modifying the analysis conditions defined in the method file. Accordingly, in the aforementioned situation, the work-log information corresponding to the manual analyses is particularly important as the target of the audit.

Consider a contrasting situation in which most of the analyses performed within the audit period were manual analyses, with a small number of batch analyses additionally performed. A possible scenario is that an intense analysis was performed for special samples (e.g., test samples under development) which are different from common samples that are routinely analyzed. In that case, manual analysis should be the standard strategy, and therefore, it is important to conversely examine the appropriateness of the batch analyses which were performed according to a fixed method file. Accordingly, the work-log information corresponding to the batch analyses is particularly important as the target of the audit.

As noted earlier, a method file to be used for a batch analysis is normally a validated file, on which the creation and/or editing of a measurement method should rarely occur. If the number of occurrences of this type of work is abnormally large, there is the possibility that the method file has been altered due to some dishonest activity.

The previously described cases are mere examples. Once the number of executions of the operation or task for each type of work is known, the auditor can select the type of work which should particularly be focused on in the audit, considering various possible scenarios under the environment or situation in which the analyzing system was used. So, the auditor selects one of the plurality of types of work on the aforementioned graph displayed on the display screen of the client terminal 2. Specifically, the auditor clicks on or near the bar corresponding to the type of work that should be selected. Then, the audit-target-item specification receiver 134 receives this operation and recognizes the selected type of work (Step S5).

Figure 3:
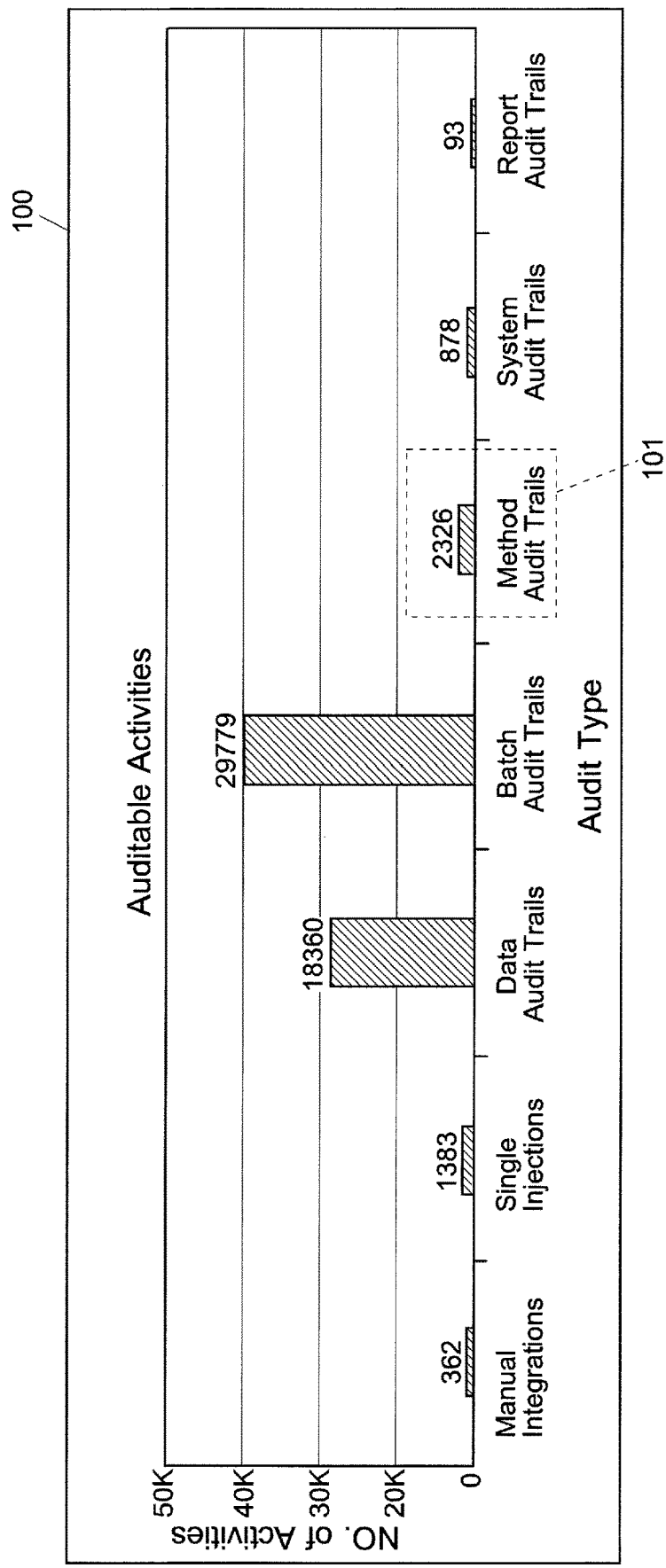
FIG. 3 is a diagram showing one example of the result of a statistical analysis of the work-log information to be audited.

In the graph 100 shown in FIG. 3, it is assumed that the item indicated by the broken line 101, which corresponds to the "method-file creation/editing", has been selected by the auditor. For example, this corresponds to the previously described case where there is a suspicion of an alteration to a method file. When one of the types of work has been selected, the work-log-list creator 135 extracts, from the comprehensive log information, only the work-log information corresponding to the selected type of work and creates a table in which important items of information included in the extracted work-log information are listed in a predetermined form. The work-log information table is displayed on the display screen of the client terminal 2 through the input/output processor 14 (Step S6).

FIG. 4 is one example of the work-log-information table to be displayed. In this table, one row corresponds to one piece of work-log information. "PC Name" is the device ID which identifies the PC 5. "Instrument Name" is the device ID which identifies the analyzing device 4. "File Name" is the name of the method file. "Audit Trail Versions" is the number of revisions of the method file.

In the present example, the work-log information in the third row has an abnormally large number of revisions as compared to the other rows. Noticing this, the auditor clicks on the "Show Details" part in the row corresponding to the work-log information in question (Step S7). In response to this operation, the work-log-data discloser 136 displays the detailed content of the indicated work-log information on the display screen of the client terminal 2. The auditor examines this detailed information to determine, for example, whether or not there was any dishonest activity (Step S8).

If there is a suspicion that a dishonest or inappropriate task was performed in a batch analysis, the auditor can selectively view the work-log information corresponding to the batch analysis and further examine the batch file to determine whether or not the analyzed samples were appropriate, or whether or not the selected method file was appropriate.

The auditor can also examine the work-log information corresponding to the system-related operation or task to confirm that there was no change in the PC setting, no installation of a software application or no other related activities that analysis operators are normally forbidden to perform on the PCs 5.

The auditor can also examine the work-log information corresponding to the report preparation/editing to confirm that there was no creation of a report showing the result of an analysis or analytical data processing, no printing of the report or no other related activities that analysis operators are normally forbidden to perform without permission.

As described to this point, in the analyzing system according to the present embodiment, the audit-work assistant 13 provides useful information for selecting a type of work which is important for the audit. Referring to this information, the auditor can select a type of work and examine the work-log information corresponding to that type of work in detail. Thus, when conducting an audit using the work-log information, the auditor can intensively check specific pieces of work-log information, rather than using equal amounts of checking time for all pieces of work-log information, so that the audit can be efficiently performed. A dishonest or inappropriate operation or task will also be easier to detect, which will reduce omissions and errors in the audit.

In the analyzing system according to the previous embodiment, the work-log-data discloser 136 can be configured to provide the following function: After selecting a piece of work-log information related to the method-file creation/editing in the previously described manner, the auditor selects two or more revised versions of the method file. Then, the work-log-data discloser 136 reads those different versions of the method file, compares them to locate changed portions, and displays the content of each version of the method file on the display screen of the client terminal 2, with the changed portions highlighted. This configuration allows the auditor to easily understand which analysis condition in the method file has been changed (or altered).

The type of analyzing devices 4 in the analyzing system according to the present embodiment is not specifically limited. Various types of analyzing devices may be combined and used as the analyzing devices 4. In particular, the present analyzing system is suitable for a system including an analyzing device having the function of automatically analyzing a large number of prepared samples, such as a liquid chromatograph or gas chromatograph equipped with an auto-sampler.

It is evident that the previous embodiment is a mere example of the present invention and can be appropriately changed or modified within the spirit and scope of the present invention.

Various Modes of Invention

A person skilled in the art can understand that the previously described illustrative embodiment is a specific example of the following modes of the present invention.

(Clause 1) One mode of the analysis information management method according to the present invention is a method for managing information related to an analysis by an analyzing device, using a computer or computers, the method including the steps of:
collecting, as comprehensive log information, work-log information related to a use of the analyzing device;
calculating the number of executions of each of a plurality of types of work including a manual analysis operation and a batch analysis operation, using at least a portion of the comprehensive log information collected in the step of collecting;
presenting, to a user, information of the number of executions of each of the types of work obtained in the step of calculating;
receiving, from the user, an input of one or more types of work selected from the plurality of types of work; and
presenting, to the user, the work-log information concerning the one or more types of work received from the user.

(Clause 8) One mode of the analysis information management system according to the present invention is an analysis information management system for managing information related to an analysis by an analyzing device, the system including:
an information collector configured to collect, as comprehensive log information, work-log information related to a use of the analyzing device;
a statistical processor configured to calculate the number of executions of each of a plurality of types of work including a manual analysis operation and a batch analysis operation, using at least a portion of the comprehensive log information collected by the information collector;
a first information presenter configured to present, to a user, information of the number of executions of each of the types of work obtained by the statistical processor;

a type-of-work receiver configured to receive, from the user, an input of one or more types of work selected from the plurality of types of work; and a second information presenter configured to create, in response to an input operation of a selection by the user through the type-of-work receiver, a list of the work-log information concerning the one or more types of work selected, and present the list to the user.

The analysis information management method described in Clause 1 and the analysis information management system described in Clause 8 enable an auditor to conduct a detailed analysis of work-log information for the audit after narrowing the work-log information down to particularly noteworthy pieces of information, or more specifically, to such types of work-log information that are suspected of being linked with dishonest activities or most likely to have resulted from an erroneous or incorrect operation. This enables the auditor to efficiently examine work-log information and perform the audit. Consequently, the present invention reduces the burden of the auditor and decreases the amount of labor and expense for the audit. The present invention can also reduce omissions and errors in the audit and increase the accuracy of the data integrity.

One mode of the analysis information management program for carrying out the analysis information management method described in Clause 1 is an analysis information management program for managing information related to an analysis by an analyzing device, using a computer or computers, the analysis information management program configured to make the computer or computers perform the steps of:

collecting, as comprehensive log information, work-log information related to a use of the analyzing device;

calculating the number of executions of each of a plurality of types of work including a manual analysis operation and a batch analysis operation, using at least a portion of the comprehensive log information collected in the step of collecting;

presenting, to a user, information of the number of executions of each of the types of work obtained in the step of calculating;

receiving, from the user, an input of one or more types of work selected from the plurality of types of work; and presenting, to the user, the work-log information concerning the one or more types of work received from the user.

The analysis information management program according to the above mode can be stored in a non-transitory computer readable record medium, such as a CD-ROM, DVD-ROM, memory card or USB memory (dongle), to be offered to users. The program may also be offered to users in the form of data transferred through the Internet or similar communication network. Furthermore, the program may be pre-installed on a computer (or to be exact, on a storage device which is a component of the computer) included in a system before the system is purchased by a user.

(Clause 2) The analysis information management method described in Clause 1 may further include the step of extracting, from the comprehensive log information, the work-log information concerning the one or more types of work received from the user.

(Clause 9) In the analysis information management system described in Clause 8, the second information presenter may be configured to extract, from the comprehensive log information, the work-log information concerning the one or more types of work received by the type-of-work receiver.

The analysis information management method described in Clause 2 and the analysis information management system described in Clause 9 can gather, from the collected comprehensive log information, the work-log information corresponding to a desired type of work without omission.

(Clause 3) The analysis information management method described in Clause 1 may further include a step of allowing the user to specify a period of time during which the work-log information should be collected as the comprehensive log information in the step of collecting, and a step of receiving the period of time.

(Clause 10) The analysis information management system described in Clause 8 may further include a period specifier configured to allow the user to specify a period of time during which the work-log information should be collected as the comprehensive log information in the information collector, and receive the period of time.

The analysis information management method described in Clause 3 and the analysis information management system described in Clause 10 allow an auditor to conveniently audit the work-log information collected within a desired period of time.

(Clause 4) In the analysis information management method described in one of Clauses 1-3, the types of work may include a system-related operation.

(Clause 11) Similarly, in the analysis information management system described in one of Clauses 8-10, the types of work may include a system-related operation.

Examples of the "system-related operation" include a change in the setting of a computer included in the system, as well as the installation, uninstallation and update of a software application. For example, in an analyzing system used in an analysis trustee company or similar organization, analysis operators are often forbidden to change the setting of a computer in a manner that does not follow a manual (or the like).

The analysis information management method described in Clause 4 and the analysis information management system described in Clause 11 allow an auditor to easily notice a situation in which system-related operations that should be performed with extremely low frequency have been performed an extraordinarily large number of times. This enables the auditor to recognize an unintended or intended alteration to the system.

(Clause 5) In the analysis information management method described in one of Clauses 1-4, the types of work may include a report preparation in which a report concerning an analysis operation or analytical data processing is prepared.

(Clause 12) Similarly, in the analysis information management system described in one of Clauses 8-11, the types of work may include a report preparation in which a report concerning an analysis operation or analytical data processing is prepared.

For example, in an analyzing system used in an analysis trustee company or similar organization, analysis operators are normally forbidden to freely prepare and output a report; they must follow a manual when performing those tasks.

The analysis information management method described in Clause 5 and the analysis information management system described in Clause 12 allow the auditor to easily notice a situation in which operations related to the report preparation that should normally be performed with extremely low frequency have been performed an extraordinarily large number of times. This enables the auditor to check for suspicious activities, such as an analysis operator (or similar individual) preparing a report and smuggling out its printout against the related rules in the manual.

(Clause 6) In the analysis information management method described in one of Clauses 1-5, the types of work may include a method creation/editing.

(Clause 13) Similarly, in the analysis information management system described in one of Clauses 8-12, the types of work may include a method creation/editing.

A "method" in the present context is a file which specifies analysis conditions and other related matters in detail. For example, in an analyzing system used in an analysis trustee company or similar organization, analysis operators are often forbidden to create a new method or edit an already created method without permission.

The analysis information management method described in Clause 6 and the analysis information management system described in Clause 13 allow the auditor to detect, for example, a situation in which analysis conditions have been different from the intended ones due to an unexpected editing of the method.

(Clause 7) The analysis information management method described in one of Clauses 1-6 may further include a step of receiving a selection by the user on the list of work-log information presented in the step of presenting work-log information to the user, and a step of obtaining detailed information concerning the selected work-log information and presenting the detailed information to the user.

(Clause 14) Similarly, the analysis information management system described in one of Clauses 7-13 may further include a detailed information presenter configured to receive a selection by the user on the list of work-log information presented by the second information presenter, obtain detailed information concerning the selected work-log information, and present the detailed information to the user.

For example, the system can be configured so that the user is allowed to click on a desired piece of work-log information on the list of work-log information displayed on the display screen, whereupon the detailed information presenter reads the content of the corresponding work-log information and displays it on the display screen.

As another possibility, the system may be configured so that the user is allowed to specify a plurality of pieces of work-log information and issue a command to extract their differences, whereupon the detailed information presenter reads the contents of the corresponding pieces of work-log information and search for their differences, such as a difference in the value of a specific parameter in the analyzing conditions, to extract and display only the pieces of information which have some differences.

In the analysis information management method described in Clause 7 and the analysis information management system described in Clause 14, the auditor only needs to perform simple operations to conduct a detailed analysis of a piece of work-log information which is suspected of being linked with a dishonest or inappropriate activity, and to determine whether or not there is any problem with the work-log information.

REFERENCE SIGNS LIST

1 . . . Server
10 . . . Analysis Data Collector
11 . . . Log Information Collector
12 . . . Data Storage Section
13 . . . Audit-Work Assistant
130 . . . Audit-Period Specification Processor
131 . . . Audit-Target-Log Collector
132 . . . Statistical Processor
133 . . . Statistical-Result-Graph Creator
134 . . . Audit-Target-Item Specification Receiver
135 . . . Work-Log-List Creator
136 . . . Work-Log-Data Discloser
14 . . . Input/Output Processor
2 . . . Client Terminal
3 . . . Communication Network
4 . . . Analyzing Device
5 . . . PC

The invention claimed is:

1. An analysis information management method, using a computer or computers, the method comprising steps of:
    collecting, using a processor mounted on the computer or computers, work-log information including details of analyses using an analyzing device, the analyzing being manual analyses each executed via a manual operation or batch analyses each executed via a batch operation, the manual operation being based on an input by an analysis operator, and the batch operation being based on a batch file retrieved from a memory;
    calculating using the processor, among the analyses, a number of executions of the manual analyses as a first number and a number of executions of the batch analyses as a second number, using the work-log information;
    presenting, to a user, via a display screen of the computer or computers, information of the first number and the second number; and
    presenting, based on an input from the user, via the display screen of the computer or computers, detailed information for either the manual analyses or the batch analyses, the detailed information being prepared by extracting from the work-log information.

2. The analysis information management method according to claim 1, further comprising receiving from the user a second input specifying a period of time during which the work-log information should be collected in the step of collecting.

3. An analysis information management system, using a computer or computers, the system comprising:
    a memory configured to store a batch file;
    a display screen mounted on the computer or computers; and
    a processor mounted on the computer or computers, configured to:
        collect work-log information including details of analyses using an analyzing device, the analyzing being manual analyses each executed via a manual operation or batch analyses each executed via a batch operation, the manual operation being based on an input by an analysis operator, and the batch operation being based on the batch file retrieved from a memory;
        calculate, among the analyses, a number of executions of the manual analyses as a first number and a number of executions of the batch analyses as a second number, using the work-log information;
        present, to a user, via the display screen of the computer or computers, information of the first number and the second number; and
        present, based on an input from the user, via the display screen of the computer or computers, detailed information for either the manual analyses or the batch analyses, the detailed information being prepared by extracting from the work-log information.

4. The analysis information management system according to claim 3, wherein the processor is further configured to receive from the user a second input specifying a period of time during which the work-log information should be collected.

\* \* \* \* \*